(12) United States Patent
Kessler et al.

(10) Patent No.: US 7,669,462 B2
(45) Date of Patent: Mar. 2, 2010

(54) INTERNAL COMBUSTION ENGINE INCLUDING A SENSOR FOR DETECTING A PARAMETER PARTIALLY CHARACTERIZING A COURSE OF COMBUSTION AND STRATEGICALLY POSITIONED BETWEEN TWO ADJACENT COMBUSTION CHAMBERS

(75) Inventors: Michael Kessler, Weissach (DE); Mattias Schueler, Steinheim (DE); Martin Buchholz, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 181 days.

(21) Appl. No.: 11/985,645

(22) Filed: Nov. 14, 2007

(65) Prior Publication Data
US 2008/0134772 A1    Jun. 12, 2008

(30) Foreign Application Priority Data
Nov. 15, 2006   (DE) .................. 10 2006 053 806

(51) Int. Cl.
*G01M 15/08* (2006.01)
(52) U.S. Cl. .................................. 73/114.16
(58) Field of Classification Search ............. 73/114.16, 73/114.17, 114.18, 114.19, 114.21
See application file for complete search history.

(56) References Cited

U.S. PATENT DOCUMENTS

| | | | |
|---|---|---|---|
| 7,111,505 B2* | 9/2006 | Kestly et al. ............. | 73/114.18 |
| 7,310,993 B2* | 12/2007 | Popielas et al. .......... | 73/35.12 |
| 2003/0074957 A1* | 4/2003 | Lemecha et al. .......... | 73/118.1 |
| 2005/0115311 A1* | 6/2005 | Kestly et al. ............. | 73/115 |
| 2005/0126262 A1* | 6/2005 | Popielas et al. .......... | 73/35.12 |
| 2006/0096362 A1* | 5/2006 | Vialard .................... | 73/119 R |

FOREIGN PATENT DOCUMENTS

| | | |
|---|---|---|
| DE | 19803470 | 8/1999 |
| DE | 101080581 | 9/2002 |
| EP | 0621470 | 10/1994 |

* cited by examiner

*Primary Examiner*—Eric S McCall
(74) *Attorney, Agent, or Firm*—Kenyon & Kenyon LLP

(57) ABSTRACT

An internal combustion engine having at least two combustion chambers, the internal combustion engine having at least one sensor for detecting a parameter partially characterizing the course of combustion, in particular a parameter correlating with an internal combustion chamber pressure. The sensor is situated in a region of the internal combustion engine between two mutually adjacent combustion chambers.

20 Claims, 2 Drawing Sheets

INTERNAL COMBUSTION ENGINE INCLUDING A SENSOR FOR DETECTING A PARAMETER PARTIALLY CHARACTERIZING A COURSE OF COMBUSTION AND STRATEGICALLY POSITIONED BETWEEN TWO ADJACENT COMBUSTION CHAMBERS

CROSS REFERENCE

This application claims priority under 35 U.S.C. §119 to German Patent Application DE 102006053806.4, filed on Nov. 15, 2006, which is expressly incorporated herein by reference in its entirety.

FIELD OF THE INVENTION

The present invention relates to an internal combustion engine having at least two combustion chambers, the internal combustion engine including at least one sensor for detecting a parameter that partially characterizes the course of combustion, in particular a parameter that correlates with an internal combustion chamber pressure.

BACKGROUND INFORMATION

Pressure sensors, which measure the pressure prevailing in the combustion chamber directly, can be utilized to determine the internal pressure of a combustion chamber of an internal combustion engine. However, since very high temperature prevail inside a combustion chamber of an internal combustion engine, this type of pressure measurement is generally used only on test stands.

Conventionally, sensors are used to measure the pressure in the combustion chamber not directly but indirectly. In European Patent No. EP 0 621 470 A2, for example, a cylinder-pressure sensor is described which can be screwed into a thread provided to accommodate the spark plug assigned to the combustion chamber. German Patent Application No. DE 198 03 470 A1 describes capacitive strain-sensing elements which detect the surface expansion of a component that is directly or indirectly acted upon by the pressure prevailing in a cylindrical combustion chamber.

German Patent Application No. DE 101 08 051 A1 describes disposing force sensors between the head of a cylinder-head bolt and the upper face of the cylinder head of an internal combustion engine in order to infer the internal pressure of a combustion chamber via the linear deformation of the cylinder-head bolt.

Conventional devices have the disadvantage that the precise detection of a parameter correlating with an internal pressure of a combustion chamber is relatively complicated and may require a multitude of sensors, in particular.

SUMMARY

An object of the present invention is to provide an internal combustion engine of the type mentioned in the introduction, by which a parameter partially characterizing the course of combustion, in particular a parameter correlating with an internal pressure of a combustion chamber, is able to be detected as precisely as possible and with a minimum of effort.

According to an embodiment of the present invention, this objective may be achieved by disposing the sensor in a region of the internal combustion engine between two mutually adjacent combustion chambers.

The use of one sensor disposed between two mutually adjacent combustion chambers makes it possible to reduce the number of sensors since one sensor is now assignable to different combustion chambers. By placing the sensor in an intermediate position between these combustion chambers, a parameter that correlates with, for instance, a particular internal combustion chamber pressure of the combustion chambers, is able to be detected locally. This may also improve the accuracy of the detection of the parameter in comparison with the known devices.

According to a further development of the present invention, it is proposed that every combustion chamber have a central axis and that the sensor be disposed equidistantly to the axes of the mutually adjacent combustion chambers. This has the advantage that the signal strengths of the parameters partially characterizing the course of combustion and assigned to an individual combustion chamber are of equal magnitude. However, it is also possible to place the sensor such that no equidistance is established; in that case, the signal strength is increased with regard to a combustion chamber that lies closer to the sensor, and the signal strength of the other combustion chamber is decreased.

The central axes of the combustion chambers may be disposed parallel to each other, in the conventional manner, and define a plane by their axes. The sensor may be situated within this plane or at an offset with respect to this plane. In a placement within the plane the distance to the combustion chambers is especially short, thereby making the signal strength particularly high. In an offset of the sensors with respect to the plane, the sensor may be situated in regions of the internal combustion engine that are exposed to lower thermal loading. As an example, the sensor may be situated in a region assigned to the intake side of the internal combustion engine. In that way the sensor need not be resistant to high temperatures as should be the case in a placement on the discharge side of the internal combustion engine.

The particular number of combustion chambers and sensors of the internal combustion engine may be such that the number of sensors used for one cylinder bank of the internal combustion engine equals one half of the number of cylinders of this cylinder bank. Thus, in the case of a four-cylinder in-line engine, it is possible to use only two sensors, or in the case of a V8-engine, to use only two sensors per cylinder bank, i.e., a total of four sensors.

To further increase the accuracy of the detection of the parameter correlating with an internal pressure in the combustion chamber, one cylinder bank of the internal combustion engine also may have sensors numbering "n", this cylinder bank having an "n+1" number of combustion chambers. In this constellation only one sensor is assigned to the outwardly lying combustion chambers of a cylinder bank of the internal combustion engine, while inwardly lying combustion chambers of a cylinder bank of the internal combustion engine may be assigned two sensors. For example, two sensors may be used in a V5-engine for the one cylinder bank having three cylinders, and one sensor may be used for the other cylinder bank having two cylinders.

According to a further development of the present invention, the internal combustion engine has a housing made up of multiple parts, parts of the housing being interconnected via at least one connection element, and the sensor being disposed adjacent to, or on, the connection element. Such a connection element may be embodied by a cylinder-head bolt, for example. It may be especially advantageous in this specific embodiment if the sensor and the connection element are mutually aligned along a straight line, the line extending in parallel to the central axes of the combustion chambers. This makes it possible to take the relatively pronounced expansion of a cylinder-head bolt into account in the detection of the parameter.

Furthermore, it is possible for the connection element to engage with a thread formed on a housing part and for the sensor to be disposed on, or inside, this thread. This allows the sensor to be positioned inside the internal combustion engine in an especially simple manner.

According to an especially advantageous specific embodiment of the present invention, the region in which the sensor is situated is bounded by the connection element and/or a crankshaft of the internal combustion engine. In this region, which thus is situated between two mutually adjacent combustion chambers and at the same time is bounded by the connection element and/or the crankshaft, relatively high forces occur, which are able to be detected very well with the aid of the sensor. It is therefore suggested that the parameter partially characterizing the course of combustion concerns the deformation of the particular material that forms the region situated between the combustion chambers. The parameter may correspond to the expansion and/or compression of the material.

In order to be able to detect such a parameter, the sensor may be designed as strain gauge, for example, or also as piezo-ceramic sensor. The signal supplied by the sensor to the internal combustion engine according to the present invention may be used directly in order to influence the operation of the internal combustion engine, for instance in order to determine injection quantities, ignition timing or the like. However, it is especially advantageous if the internal combustion engine includes an evaluation unit, which assigns a corresponding internal pressure of a combustion chamber to an amount of the parameter partially characterizing the course of combustion, in particular the parameter correlating with a corresponding internal pressure of the combustion chamber. This is advantageous since the internal pressure in the combustion chamber constitutes a meaningful reference variable for a multitude of operating parameters of an internal combustion engine.

The internal combustion engine may be both a stationary engine and a motor-vehicle engine.

BRIEF DESCRIPTION OF THE DRAWINGS

Additional advantages, features and details of the present invention are described below, in which an especially preferred exemplary embodiment of the present invention is explained in detail with reference to the figures. In this context, the features shown in the figures and the specification may be used either alone or in any combination according to the present invention.

DETAILED DESCRIPTION OF EXAMPLE EMBODIMENTS

Figure 1:
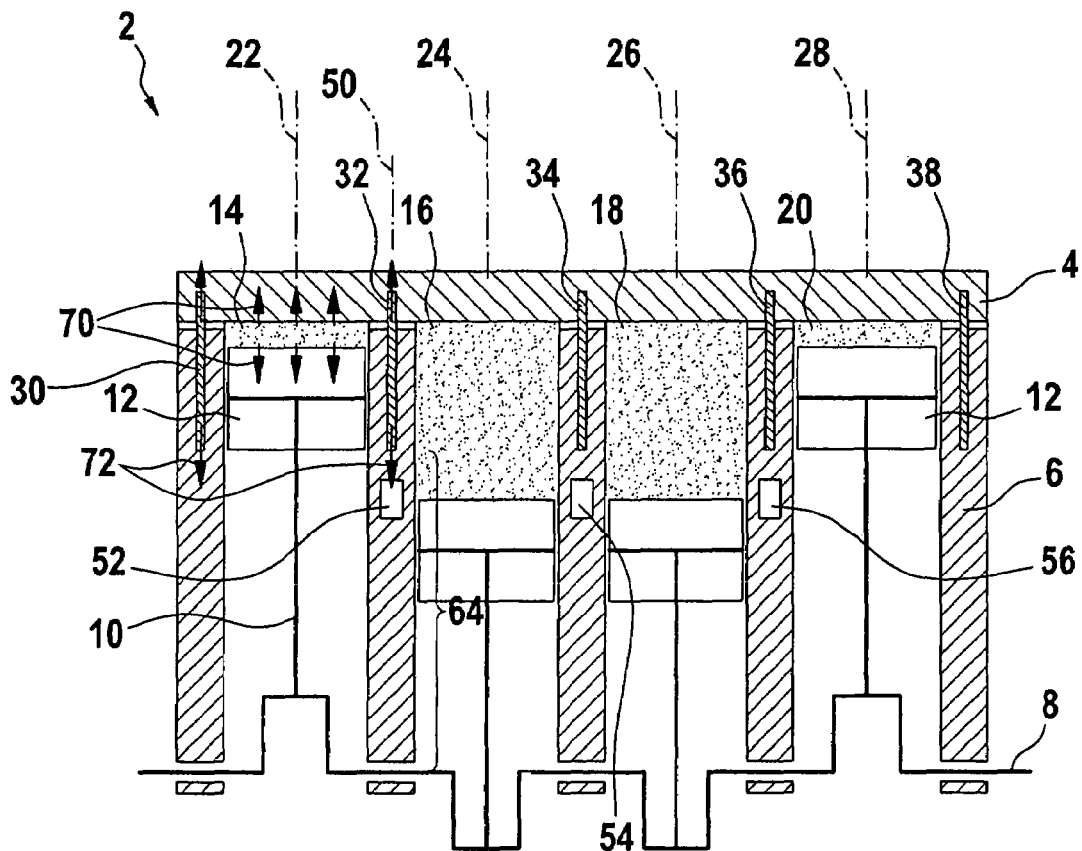
FIG. 1 shows a side view of an internal combustion engine.

FIG. 1 shows a lateral section of an internal combustion engine denoted by reference numeral 2 in its entirety. Internal combustion engine 2 has an upper cylinder head 4, which covers a crankcase 6. A crankshaft 8 is supported inside crankcase 6.

Supported on the crank pins of crankshaft 8 are a total of four connecting rods 10 of internal combustion engine 2, which each carry a piston 12 at their ends facing cylinder head 4. Each piston 12 delimits a combustion chamber; these are first combustion chamber 14, second combustion chamber 16, third combustion chamber 18, as well as fourth combustion chamber 20. Combustion chambers 14 through 20 have a cylindrical design and centric combustion-chamber axes 22, 24, 26 and 28, respectively. They are aligned in parallel with one another.

Figure 2:
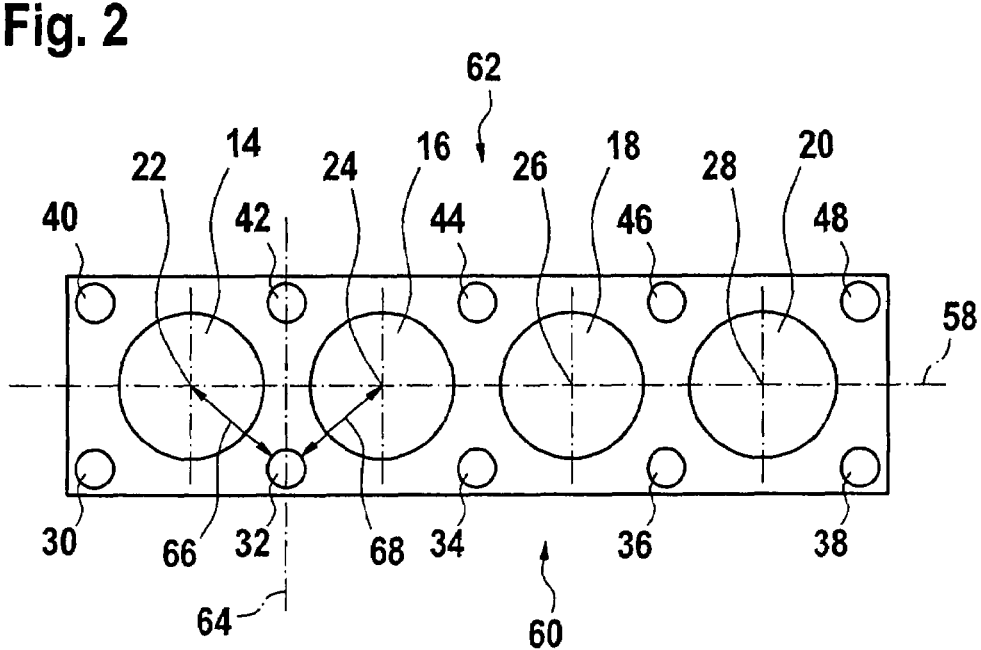
FIG. 2 shows a schematic topside view of the internal combustion engine according to FIG. 1.

Cylinder head 4 and crankcase 6 are interconnected via a total of ten connection elements 30 through 48 (also cf. FIG. 2). These connection elements may be embodied in the conventional manner by longitudinal cylinder-head bolts. Connection elements 30 through 48 extend parallel to combustion-chamber axes 22 through 28. This is illustrated for connection element 32 by way of example with the aid of straight line 50. Disposed in alignment with connection element 32 is a sensor 52. Analogously, a sensor 54 is situated between combustion chambers 16 and 18 in alignment with connection element 34, and a sensor 56 is situated between combustion chambers 18 and 20 in alignment with connection element 36.

The position of connection elements 30 through 48 can be seen especially well in FIG. 2. It can be seen there that combustion-chamber axes 22 through 28 are disposed within a plane 58, and connection elements 32 through 36 (and thus sensors 52 through 56, cf. FIG. 1) are situated at an offset to this plane 58. Sensor 52 shown in FIG. 1 is disposed in a region denoted by 64 in FIG. 2, which may be described by a plane that is situated symmetrically between combustion-chamber axes 22 and 24. According to FIG. 1, this region 64 is bounded by connection element 32 on one side and crankshaft 8 on the other side. This applies analogously to the placement of sensors 54 and 56.

It can be gathered from FIG. 2 that connection element 32 and thus sensor 52 are disposed such that their distance 66 with respect to combustion-chamber axis 22 is equal to their distance 68 with respect to combustion-chamber axis 24. This symmetrical placement has the advantage that equally high signal strengths of sensor 52 are obtainable for the associated combustion chambers 14 and 16. However, it is also possible to install sensor 52 at an offset, i.e., not in symmetry with combustion chambers 14 and 16, so as to increase the signal strength with regard to one combustion chamber. The same once again applies to sensors 54 and 56.

Sensors 52 through 56 are situated on the intake side of internal combustion engine 2, which is denoted by 60 in FIG. 2. This has the advantage that they may exhibit relatively low temperature stability. The sensors could also be placed on the opposite discharge side of internal combustion engine 2, which is denoted by 62, but would then have to be able to withstand higher temperatures.

FIG. 1 shows internal combustion engine 2 in a state in which combustion chamber 14 begins its power cycle. This produces a force, which is indicated by arrows 70 and acts on cylinder head 4 on the one hand, and on piston 12 on the other hand, so that it is able to drive crankshaft 8 via connecting rod 10. The forces produced in this manner cause an expansion of connection elements 30 through 48, which is indicated by arrows 72 in FIG. 1.

Figure 3:
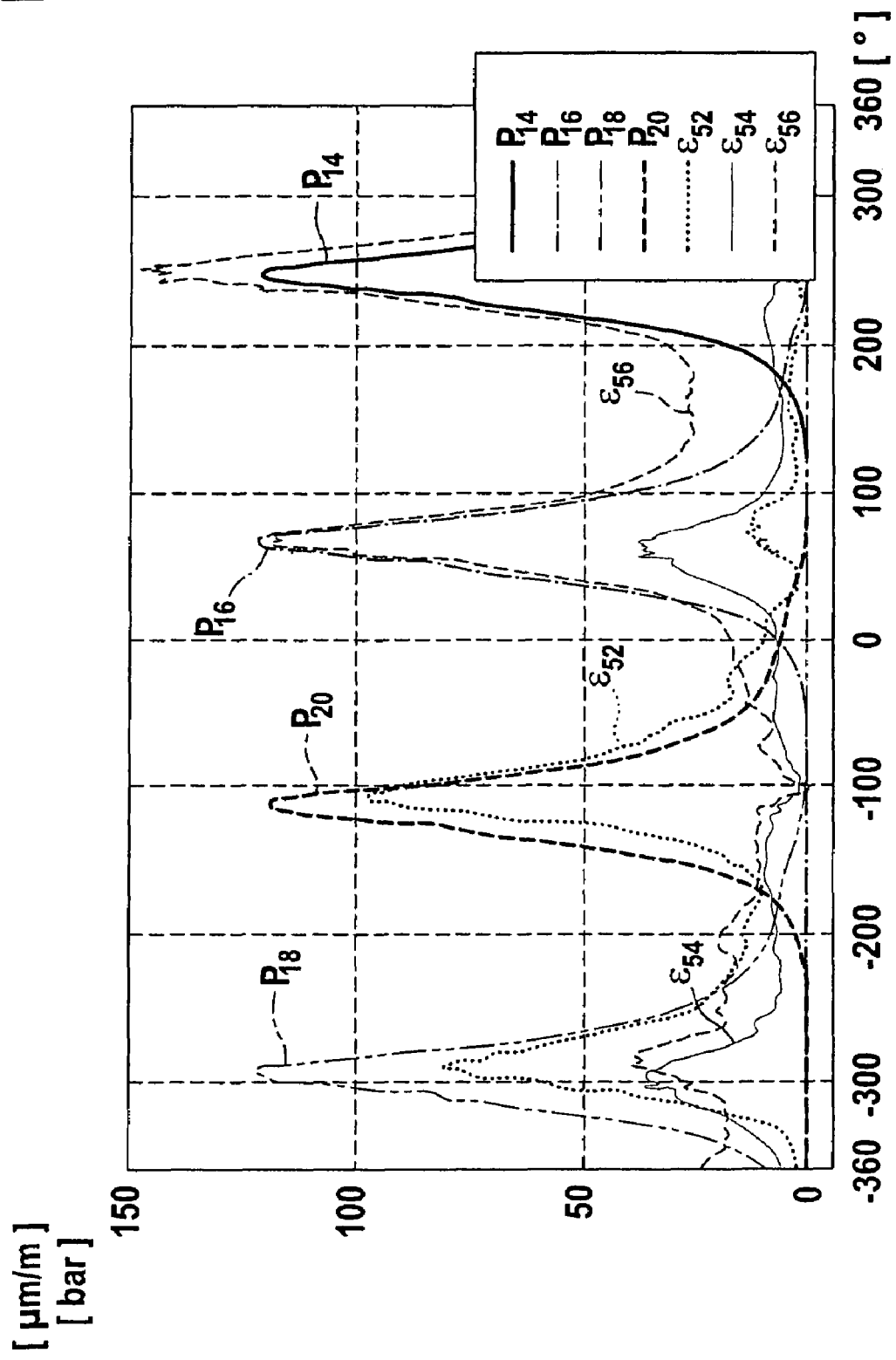
FIG. 3 shows a diagram to illustrate material expansions in different regions of the internal combustion engine according to FIG. 1, and internal pressures of different combustion chambers of the internal combustion engine according to FIG. 1.

FIG. 3 shows the characteristic of the internal combustion-chamber pressures inside combustion chambers 14 through 20. On the X-axis of the diagram, the rotation angles of crankshaft 8 are indicated, i.e., for two full rotations of crankshaft 8, so that a complete power cycle of internal combustion engine 2 is able to be represented. The Y-axis of the diagram indicates unit μm/m, which is assigned to the linear expansions recorded by sensors 52, 54 and 56. The Y-axis of the diagram also displays the "bar" unit, which is assigned to the internal combustion-chamber pressures of combustion chambers 14 through 20.

The diagram illustrates four pressure characteristics p14 through p20. Moving along the X-axis from −360° to +360°, it can be seen that the pressure maxima are present in succession in combustion chambers 18, 20, 16 and 14. This corresponds to the firing order of combustion chambers 14 through 20. The pressure maxima for the selected exemplary embodiment amount to approximately 125 bar.

The linear expansion sketched in FIG. 1 can be detected with the aid of sensors 52, 54 and 56. Individual expansions that occur in a twofold rotation of crankshaft 8 are illustrated in FIG. 3 by $\epsilon_{52}$, $\epsilon_{54}$ und $\epsilon_{56}$. Moving along the X-axis from −360° to +360°, the pressure maximum of combustion chamber 18 corresponds to the expansion maxima of curves $\epsilon_{52}$ und $\epsilon_{54}$. At maximum pressure in combustion chamber 20, a maximum of the characteristic of curve $\epsilon_{52}$ is present. Maxima of curves $\epsilon_{56}$ and $\epsilon_{54}$ are assigned to the pressure maximum of combustion chamber 16. Finally, a maximum of curve $\epsilon_{56}$ is assigned to the maximum pressure in combustion chamber 14.

Pressure characteristics p14 through p20 shown in FIG. 3 have been measured in a stationary internal combustion engine using additional pressure sensors. In practice it is possible to analyze the characteristics of curves $\epsilon_{52}$ through $\epsilon_{56}$ with the aid of an evaluation unit in order to infer the characteristics of the internal combustion chamber pressures combustion chambers 14 through 20 without measuring pressures directly.

What is claimed is:

1. An internal combustion engine, comprising:
   at least two combustion chambers; and
   at least one sensor adapted to detect a parameter partially characterizing a course of combustion, the parameter correlating with an internal combustion chamber pressure;
   wherein:
      the sensor is situated in a region of the internal combustion engine between two mutually adjacent ones of the combustion chambers;
      the internal combustion engine has a multi-part housing, parts of the housing being interconnected via at least one connection element;
      the connection element engages with a thread formed on a housing part; and
      the sensor is disposed adjacent to, or on, the connection element, and on, or inside, the thread.

2. The internal combustion engine as recited in claim 1, wherein each combustion chamber has a central axis, and the sensor is disposed equidistantly from the axes of the two mutually adjacent ones of the combustion chambers.

3. The internal combustion engine as recited in claim 2, wherein the axes define a plane, and the sensor is situated at an offset with respect to the plane.

4. The internal combustion engine as recited claim 1, wherein the sensor is situated in a region assigned to an intake side of the internal combustion engine.

5. The internal combustion engine as recited in claim 1, wherein one cylinder bank of the internal combustion engine has sensors numbering "n", and the cylinder bank of the internal combustion engine has combustion chambers numbering "n times 2".

6. The internal combustion engine as recited in claim 1, wherein one cylinder bank of the internal combustion engine has sensors numbering "n", and the cylinder bank of the internal combustion engine has combustion chambers numbering "n plus 1".

7. The internal combustion engine as recited in claim 1, wherein the sensor and the connection element are aligned with each other along a straight line extending in parallel to a central axes of the combustion chambers.

8. The internal combustion engine as recited in claim 1, wherein the region in which the sensor is situated is bounded by at least one of the connection element and a crankshaft of the internal combustion engine.

9. The internal combustion engine as recited in claim 1, wherein the parameter correlating with the internal combustion chamber pressure pertains to a deformation of a particular material that forms the region between the combustion chambers.

10. The internal combustion engine as recited in claim 9, wherein the parameter corresponds to at least one of an expansion and compression of the material.

11. The internal combustion engine as recited in claim 1, wherein the sensor is a strain gauge.

12. The internal combustion engine as recited in claim 1, further comprising:
   an evaluation unit adapted to assign a corresponding internal combustion chamber pressure to an amount of the parameter correlating with the internal combustion chamber pressure.

13. The internal combustion engine as recited in claim 1, wherein the internal combustion engine is a stationary engine.

14. The internal combustion engine as recited in claim 1, wherein the internal combustion engine is a motor vehicle engine.

15. An internal combustion engine, comprising:
   at least two combustion chambers; and
   at least one sensor adapted to detect a parameter partially characterizing a course of combustion, the parameter correlating with an internal combustion chamber pressure;
   wherein the sensor is a piezo-ceramic strain gauge sensor and is situated in a region of the internal combustion engine between two mutually adjacent ones of the combustion chambers.

16. The internal combustion engine as recited in claim 15, wherein the internal combustion engine has a multi-part housing, parts of the housing being interconnected via at least one connection element, and the sensor is disposed adjacent to, or on, the connection element.

17. The internal combustion engine as recited in claim 15, wherein each combustion chamber has a central axis, and the sensor is disposed equidistantly from the axes of the two mutually adjacent ones of the combustion chambers.

18. The internal combustion engine as recited in claim 17, wherein the axes define a plane, and the sensor is situated at an offset with respect to the plane.

19. The internal combustion engine as recited claim 15, wherein the sensor is situated in a region assigned to an intake side of the internal combustion engine.

20. The internal combustion engine as recited in claim 15, wherein one cylinder bank of the internal combustion engine has sensors numbering "n", and the cylinder bank of the internal combustion engine has combustion chambers numbering "n times 2" or "n plus 1".

* * * * *